(12) United States Patent  (10) Patent No.: US 8,509,981 B2
Pfeiffer  (45) Date of Patent: Aug. 13, 2013

(54) DOCKING STATIONS FOR AUTOMATED GUIDED VEHICLES

(75) Inventor: Randy Lee Pfeiffer, Haubstadt, IN (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 194 days.

(21) Appl. No.: 13/115,509

(22) Filed: May 25, 2011

(65) Prior Publication Data

US 2012/0303190 A1   Nov. 29, 2012

(51) Int. Cl.
*G05D 1/00*   (2006.01)

(52) U.S. Cl.
USPC .............................................. 701/23; 104/137

(58) Field of Classification Search
USPC ...................... 701/22, 23, 466, 519; 340/958;
104/2, 7.1, 7.2, 88.01, 88.02, 137, 249, 250
See application file for complete search history.

(56) References Cited

U.S. PATENT DOCUMENTS

| | | | |
|---|---|---|---|
| 4,944,357 A | 7/1990 | Wible et al. | |
| 5,220,263 A | 6/1993 | Onishi et al. | |
| 5,462,439 A | 10/1995 | Keith | |
| 5,498,948 A | 3/1996 | Bruni et al. | |
| 5,703,461 A | 12/1997 | Minoshima et al. | |
| 6,363,857 B1 * | 4/2002 | Kauffman | 104/88.01 |
| 6,525,510 B1 | 2/2003 | Ayano et al. | |
| 6,586,908 B2 | 7/2003 | Petersson et al. | |
| 7,430,462 B2 | 9/2008 | Chiu et al. | |
| 2009/0245930 A1 * | 10/2009 | Baulier et al. | 403/321 |
| 2009/0315501 A1 | 12/2009 | Li et al. | |
| 2010/0308768 A1 | 12/2010 | Dower | |

* cited by examiner

*Primary Examiner* — Mary Cheung
(74) *Attorney, Agent, or Firm* — Dinsmore & Shohl LLP

(57) ABSTRACT

A docking station for an automated guided vehicle includes a station base unit and a shift unit adapted to move relative to the station base unit between an extended position and a retracted position, where movement of the shift unit from the extended position to the retracted position defines a shift unit movement direction. The docking station further includes an actuator coupled to the station base unit and the shift unit, where the actuator is adapted to move the shift unit between the extended position and the retracted position and at least one locator block coupled to the shift unit. The docking station stops an automated guided vehicle travelling in the shift unit movement direction when a portion of the automated guided vehicle contacts the at least one locator block with the shift unit in the extended position.

19 Claims, 8 Drawing Sheets

DOCKING STATIONS FOR AUTOMATED GUIDED VEHICLES

TECHNICAL FIELD

The present disclosure is generally directed to docking stations for automated guided vehicles.

BACKGROUND

Automated guided vehicles (AGVs) are used in factory environments to assist with inventory management by transporting parts from one area of the factory to another. For example, parts may be loaded on an AGV in a staging area. Once the parts are loaded, the AGV may drive to an assembly area where the parts are unloaded and used in assembly processes. The AGV may travel from the staging area to the assembly area based on a control system and without intervention from users.

In some environments, robots may be used to load and/or unload parts from the AGVs. To facilitate reliable unloading of the parts from the AGVs, the position of the AGVs relative to the robots should be accurate and repeatable. Previously, AGVs would drive to docking stations affixed to the floor of the factory. Once robots had loaded or unloaded parts from the AGVs, the AGVs would reverse their immediately preceding direction of travel as to back away from the docking stations and then continue along a pre-determined path.

However, sequential reversal of direction of AGVs may cause unpredictable rotational behavior of casters, which provide support to the AGVs. This unpredictable rotational behavior of the casters may prevent the AGVs from following the pre-determined path. Failure to follow the pre-determined path may cause AGVs to go off course, which may initiate a fault that forces the AGVs to become inoperable. Accordingly, docking stations that meet to stop AGVs without requiring reversal of the direction of travel of the AGVs, may be desired.

SUMMARY

In one embodiment, a docking station for an automated guided vehicle includes a station base unit and a shift unit adapted to move relative to the station base unit between an extended position and a retracted position, where movement of the shift unit from the extended position to the retracted position defines a shift unit movement direction. The docking station further includes an actuator coupled to the station base unit and the shift unit, where the actuator is adapted to move the shift unit between the extended position and the retracted position and at least one locator block and/or at least one cam follower coupled to the shift unit. The docking station stops an automated guided vehicle travelling in the shift unit movement direction when a portion of the automated guided vehicle contacts the at least one locator block and/or the at least one cam follower with the shift unit in the extended position.

In another embodiment, an automated guided vehicle system includes an automated guided vehicle that includes a vehicle frame, a drive mechanism, and a plurality of support casters, and a docking station that includes a station base unit. One of the docking station or the automated guided vehicle includes a shift united adapted to move relative to the station base unit of the docking station or the vehicle frame of the automated guided vehicle between an extended position and a retracted position, where movement of the shift unit from the extended position to the retracted position defines a shift unit movement direction. The automated guided vehicle travelling parallel to the shift unit movement direction is stopped by the docking station when a portion of the automated guided vehicle contacts a portion of the docking station when the shift unit is located in the extended position.

In yet another embodiment, an automated guided vehicle system includes an automated guided vehicle including a vehicle frame, a drive mechanism, a plurality of support casters, and at least one cam follower. The automated guided vehicle system further includes a docking station that includes a station base unit, a shift unit adapted to move relative to the station base unit between an extended position and a retracted position, where movement of the shift unit from the extended position to the retracted position defines a shift unit movement direction. The docking station further includes an actuator coupled to the station base unit and the shift unit, and at least one locator block coupled to the shift unit. The automated guided vehicle travelling in the shift unit movement direction is stopped by the docking station when the at least one cam follower of the automated guided vehicle contacts the at least one locator block when the shift unit is located in the extended position.

BRIEF DESCRIPTION OF THE DRAWINGS

The following detailed description of specific embodiments of the present disclosure can be best understood when read in conjunction with the drawings enclosed herewith.

Figure 1:
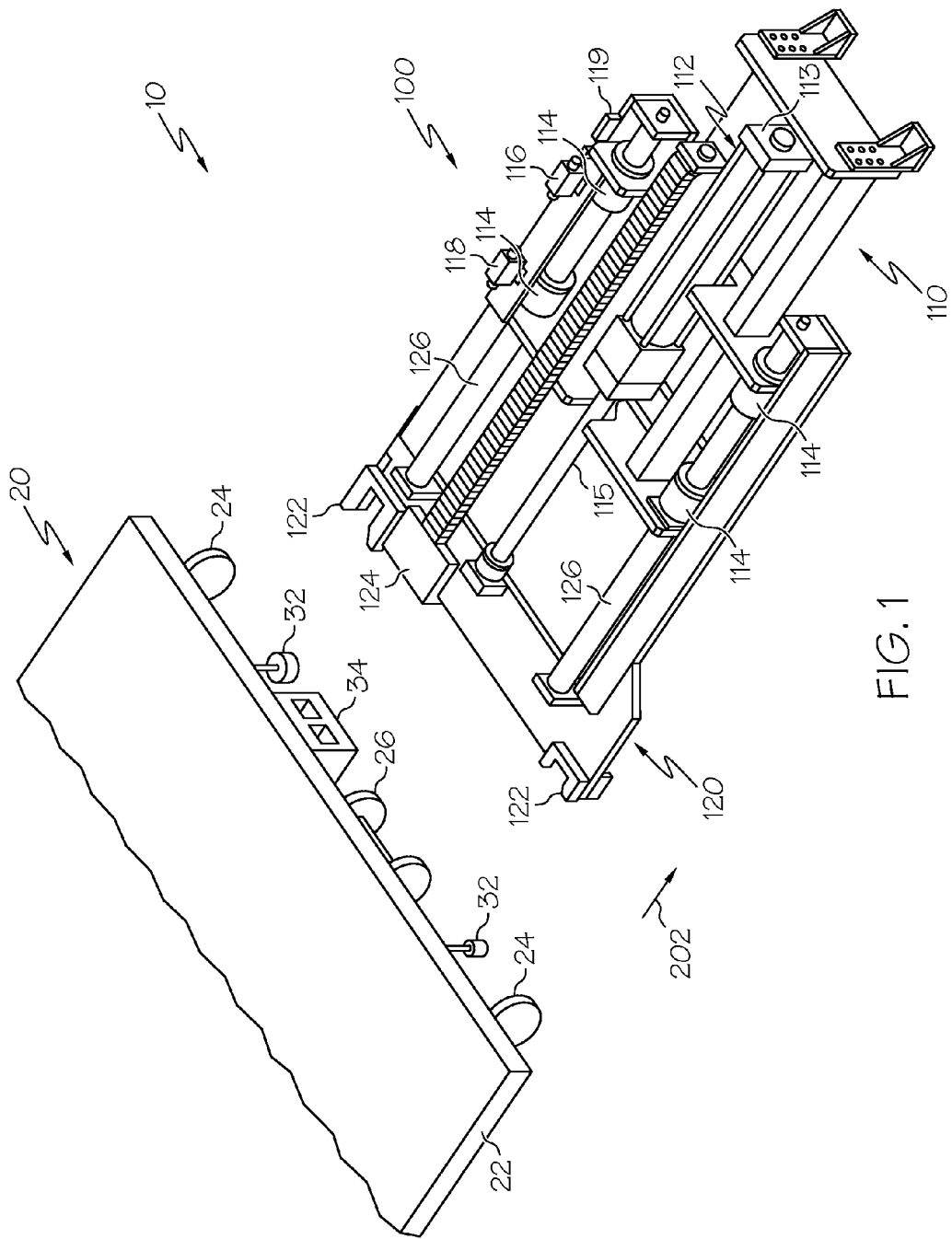
FIG. 1 depicts a schematic, perspective representation of a docking station and an autonomously guided vehicle according to one or more embodiments shown and described herein.

The embodiments set forth in the drawings are illustrative in nature and not intended to be limiting of the disclosure defined by the claims. Moreover, individual features of the drawings and disclosure will be more fully apparent and understood in view of the detailed description.

DETAILED DESCRIPTION

The following text sets forth a broad description of numerous different embodiments of the present disclosure. The description is to be construed as exemplary only and does not describe every possible embodiment since describing every possible embodiment would be impractical, if not impossible, and it will be understood that any feature, characteristic, component, composition, ingredient, product, step or methodology described herein can be deleted, combined with or substituted for, in whole or part, any other feature, characteristic, component, composition, ingredient, product, step or methodology described herein. Numerous alternative embodiments could be implemented, using either current technology or technology developed after the filing date of this patent, which would still fall within the scope of the claims.

Embodiments of the present disclosure are directed to docking stations that shift between an extended position to stop AGVs from driving forward and a retracted position to provide clearance to AGVs, such that the AGVs exit the docking station without reversing direction. When the AGVs drive into the docking stations in an extended position, portions of the AGVs come into contact with portions of the docking stations. This contact stops the AGVs and accurately and repeatably locates the AGVs for part loading and/or unloading. When the AGVs are prepared to leave the docking station, the docking stations are repositioned into a retracted position. The retracted position of the docking stations provide clearance to allow the AGVs to continue in their previous direction of travel and continue to follow a pre-determined path. Allowing the AGVs to continue their previous direction of travel, and therefore not requiring the AGVs to sequentially reverse direction of travel, increases the predictability of behavior of movement of the AGVs.

One embodiment of an AGV system 10, including an AGV 20 and a docking station 100, is depicted in FIG. 1. The AGV 20 includes a vehicle frame 22, a plurality of casters 24 that are coupled to the underside of the vehicle frame 22 and support the AGV 20 as it moves about a factory floor. The AGV 20 also includes at least one drive mechanism 26 coupled to the vehicle frame 22 and a plurality of cam followers 32. The AGV 20 further includes an electrical connector 34. In the embodiment depicted in FIG. 1, the drive mechanism 26 is controlled to rotate to provide a directional drive force to the AGV 20. The casters 24 are free to rotate, but rotation of the casters 24 is not controlled. Thus, direction of movement of the AGV 20 is determined based on the direction of application of drive force by the drive mechanism 26 and the rotational position of the casters 24.

The docking station 100 includes a station base unit 110 that is affixed to the factory floor and a shift unit 120 that moves relative to the station base unit 110. The shift unit 120 moves between an extended position, as depicted in FIG. 1, and an retracted position. In the embodiment depicted in FIG. 1, the shift unit 120 translates laterally relative to the station base unit 110. The direction of movement of the shift unit 120 from the extended position to the retracted position defines a shift unit movement direction 202.

The docking station 100 further includes an actuator 112 coupled to the station base unit 110 and the shift unit 120. The actuator 112 may be any of a variety of linear actuators, including a servo-mechanical actuator or a hydraulic actuator. As depicted in FIG. 1, the actuator cylinder 113 is coupled to the station base unit 110, while the actuator piston 115 is coupled to the shift unit 120.

The docking station 100 may include an extended position travel sensor 116 and a retracted position travel sensor 118. Both the extended position travel sensor 116 and the retracted position travel sensor 118 are shown in FIG. 1 as coupled to the station base unit 110. When the shift unit 120 is in an extended position, as is depicted in FIG. 1, the extended position travel sensor 116 may contact an extension travel stop 119, shown in FIG. 1 as coupled to the shift unit 120. A similar retraction travel stop may be positioned along the shift unit 120 to contact the retracted position travel sensor 118 when the shift unit 120 is in a retracted position.

In the embodiment depicted in FIG. 1, the station base unit 110 includes a plurality of linear bearings 114. The shift unit 120 also includes raceways 126 that are located such that the raceways 126 can be inserted along the linear bearings 114. The linear bearings 114 provide support to the shift unit 120 through the range of motion of the shift unit 120 relative to the station base unit 110.

The docking station 100 includes at least one locator block 122 coupled to the shift unit 120. Further, the docking station 100 may include a charging contact block 124 coupled to the shift unit 120. The charging contact block 124 may be positioned along the shift unit 120 along the same side as the at least one locator block 122. The at least one locator block 122 and the charging contact block 124 move with the shift unit 120 between the extended position and the retracted position. The charging contact block 124 may be connected to an electrical power source (not shown) within the factory environment.

While reference is made to the location of the actuator 112 components, the linear bearings 114, the raceways 126, the extended position travel sensor 116, the retracted position travel sensor 118, and the extension travel stop 119 as being positioned along the station base unit 110 or the shift unit 120, it should be understood that the position of these components may be modified in reference to the station base unit 110 or the shift unit 120 to allow flexibility in the design of the docking station 100, while maintaining the functionality these components and of the docking station 100 itself. Further, while reference is made to the locations of the cam followers 32, the electrical connector 34, the locator blocks 122, and the charging contact block 124 as being positioned along the AGV 20 or the docking station 100, it should be understood that the position of these components may be modified in reference to the AGV 20 or the docking station 100. In addition, while specific embodiments are discussed herein with reference to location of the shift unit 120 relative to the docking station 100, the AGV system 10 may be configured such that the shift unit 120 is positioned along the AGV 20, and moves between an extended position and a retracted position relative to the vehicle frame 22 of the AGV 20.

Figure 2:
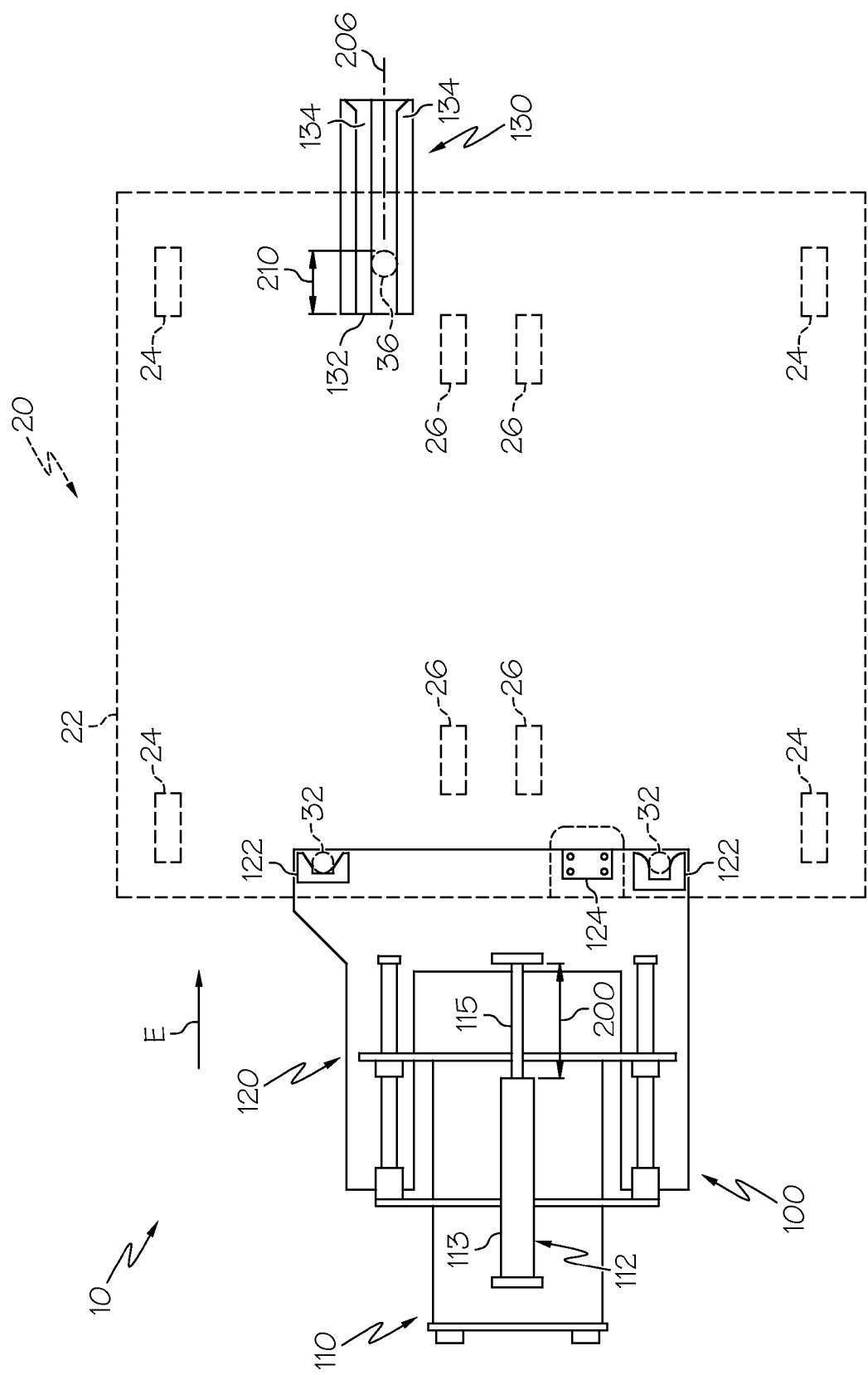
FIG. 2 depicts a schematic representation of the docking station and the autonomously guided vehicle of FIG. 1 in a docked configuration according to one or more embodiments shown and described herein.

Referring now to FIG. 2, embodiments of the AGV system 10 may also include a floor guide 130. The floor guide 130 provides an additional support point that may assist with aligning the AGV 20 relative to the docking station 100. The floor guide 130 may include a rigid channel 134 coupled to the factory floor at a distance away from the station base unit 110 and the shift unit 120. Additionally, for use with docking stations 100 that include the floor guide 130, the AGV 20 may include track roller 36 that extends downward from the vehicle frame 22 and is accepted within the rigid channel 134 formed by the floor guide 130. The track roller 36 may take the form of a commercially available cam roller.

Operation of the docking station 100 will now be discussed in reference to FIGS. 2 and 3. As discussed previously, the shift unit 120 may be positioned relative to the station base unit 110 to operate in an extended position or a retracted position. The docking station 100 depicted in FIG. 2 is shown with the shift unit 120 shifted in a direction corresponding to arrow E relative to the station base unit 110, such that the shift unit 120 is located in an extended position. With the shift unit 120 located in the extended position, the distance 200 of the actuator piston 115 that is exposed from the actuator cylinder 113 is maximized. While the actuator 112 holds the shift unit 120 in the extended position, the AGV 20 may drive towards the docking station 100 until a portion of the AGV 20 contacts the docking station 100 and the AGV 20 is stopped. As is illustrated in FIG. 2, the locator blocks 122 are positioned along a side of the shift unit 120 that the AGV 20 contacts as it drives into the docking station 100. The locator blocks 122 are positioned relative to one another along the shift unit 120 such that the cam followers 32 of the AGV 20 contact and are seated into to the locator blocks 122. As the AGV 20 drives into the docking station 100, the actuator 112 continues to apply a force to the shift unit 120 in a direction opposite the direction of travel of the AGV 20 that tends to stop the AGV 20 from driving. Because the docking station 100 accurately and repeatably locates the shift unit 120, and therefore the locator blocks 122, in the extended position relative to the station base unit 110, the stopping position of the AGV 20 along the factory floor is accurate and repeatable.

Additionally, for embodiments of the docking station 100 that include the floor guide 130, the track roller 36 of the AGV 20 is held within the floor guide 130. The distance from the floor guide exit 132 to the track roller 36 defines a floor guide exit distance 210. The interface between the floor guide 130 and the track roller 36 creates an additional point of contact to the interfaces between the locator blocks 122 and the cam followers 32. Thus, the floor guide 130 and the track roller 36 may provide additional accuracy and repeatability of locating the AGV 20 along the factory floor when the AGV 20 is stopped by the docking station 100.

Further, in embodiments of the AGV system 10 that include a charging contact block 124 coupled to the docking station 100 and an electrical connector 34 coupled to the AGV 20, the charging contact block 124 and the electrical connector 34 are positioned to come into contact with one another when the AGV 20 is stopped by the docking station 100. As the cam followers 32 of the AGV 20 come into contact with the locator blocks 122 of the docking station 100, the electrical connector 34 comes into physical contact with the charging contact block 124, forming an electrical connection. Once the AGV 20 has been stopped by the docking station 100 and the charging contact block 124 is securely engaged with the electrical connector 34, electrical current may be introduced through the charging contact block 124 to the electrical connector 34 to provide power to the AGV 20, as to charge any onboard batteries carried by the AGV 20.

In addition to or alternatively, the contact block 124 and the connector 34 may provide for connections other than for charging. For example, data or information transfer may occur between the docking station 100 and the AGV 20. In some embodiments, the docking station 100 may be connected to an electronic controller 300, which can provide updates to the docking station 100 and monitor operation of the docking station 100. Multiple docking stations 100 may also be connected together and provide updates and additional information to each other.

Figure 3:
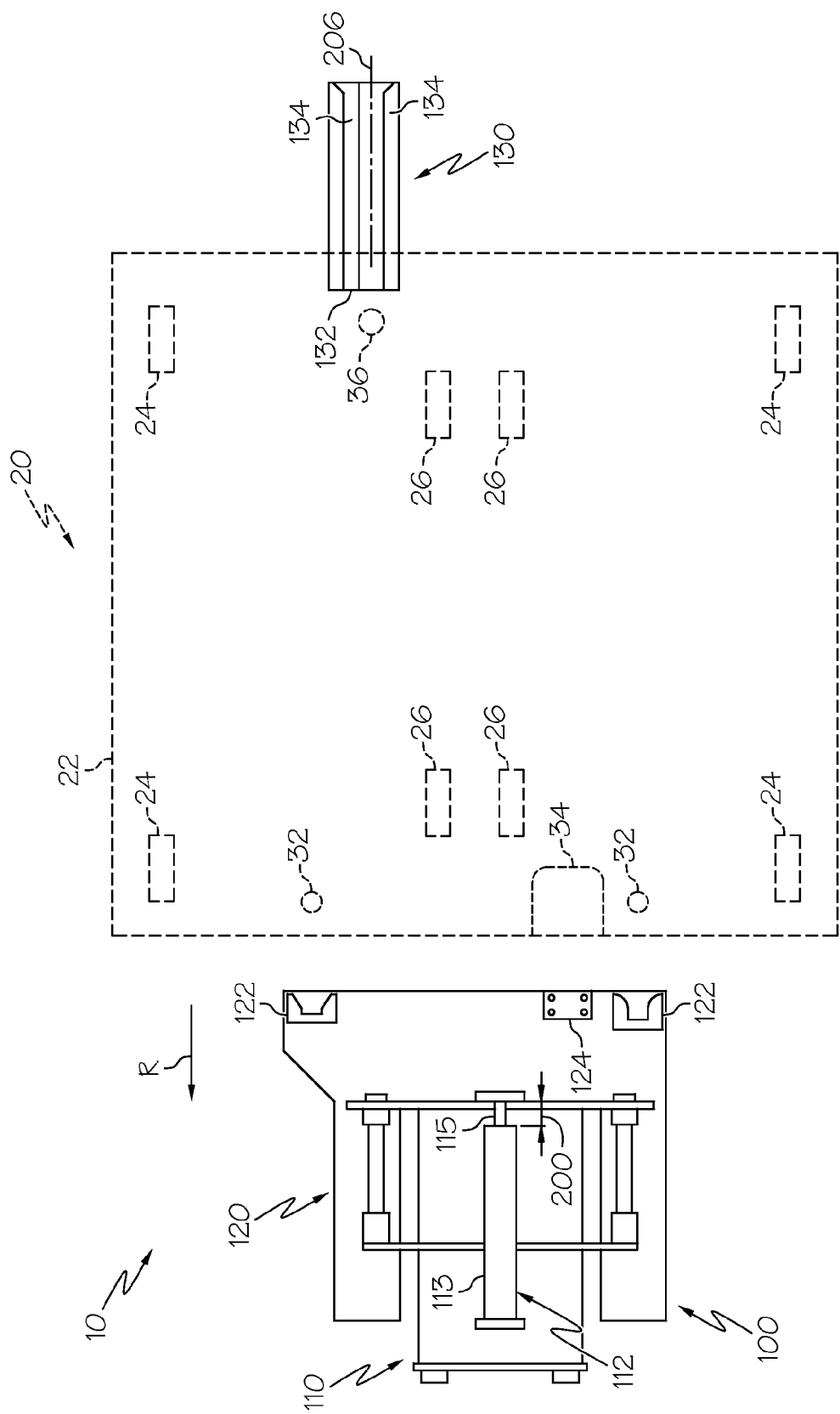
FIG. 3 depicts a schematic representation of the docking station and the autonomously guided vehicle of FIG. 1 in an undocked configuration according to one or more embodiments shown and described herein.

Referring now to FIG. 3, the docking station 100 is shown with the shift unit 120 shifting in the direction of arrow R relative to the station base unit 110, such that the shift unit 120 is located in a retracted position. In the retracted position, the distance 200 of the actuator piston 115 that is exposed from the actuator cylinder 113 is minimized. The difference between the maximum distance 200 when the shift unit 120 is in an extended position and the minimum distance 200 when the shift unit 120 is in a retracted position defines a stroke distance of the actuator 112. In this embodiment, the stroke distance of the actuator 112 is equivalent to the travel distance of the shift unit 120 between the extended position and the retracted position.

With the shift unit 120 in the retracted position, the locator blocks 122 and the charging contact block 124 are located a distance away from the cam followers 32 and the electrical connector 34 of the AGV 20. As there is no contact between the docking station 100 and the AGV 20, the AGV 20 is free to travel in the shift unit movement direction 202 towards the docking station 100 without initiating contact with the docking station 100. As is depicted in FIG. 3, the AGV 20 drives in the shift unit movement direction 202 until the track roller 36 passes beyond the floor guide exit 132, such that the track roller 36 is located outside of the floor guide 130. To prevent contact between the AGV 20 and the docking station 100 when the shift unit 120 is located in a retracted position, the travel distance of the shift unit 120, and therefore the stroke distance of the actuator 112, must be greater than the floor guide exit distance 210, as depicted in FIG. 2.

Operation and movement of the AGV 20 and the docking station 100 are depicted in FIGS. 4A-4D. The docking station 100 may be positioned relative to a robot 400 that loads and/or unloads parts from the AGV 20 when the AGV 20 is stopped and positioned by the docking station 100. As the parts may be unloaded by a robot, accurate placement of the parts on the AGV 20 may be important. The vicinity of the docking station 100 and the robot 400 may be surrounded by a light curtain 230. A light curtain 230 is an opto-electric device that transmits and receives light beams. If reception of one of the light beams is interrupted, the light curtain 230 may transmit a stop signal to the AGV 20, the docking station 100, and/or the robot 400 to stop operation. Additionally, the light curtain 230 may be programmed to allow reception of the light beams to be interrupted for a predetermined period of time, for example, to allow the AGV 20 to travel into the vicinity of the docking station 100 and/or out of the vicinity of the docking station 100 without transmitting a stop signal to the AGV 20.

Figure 4A:
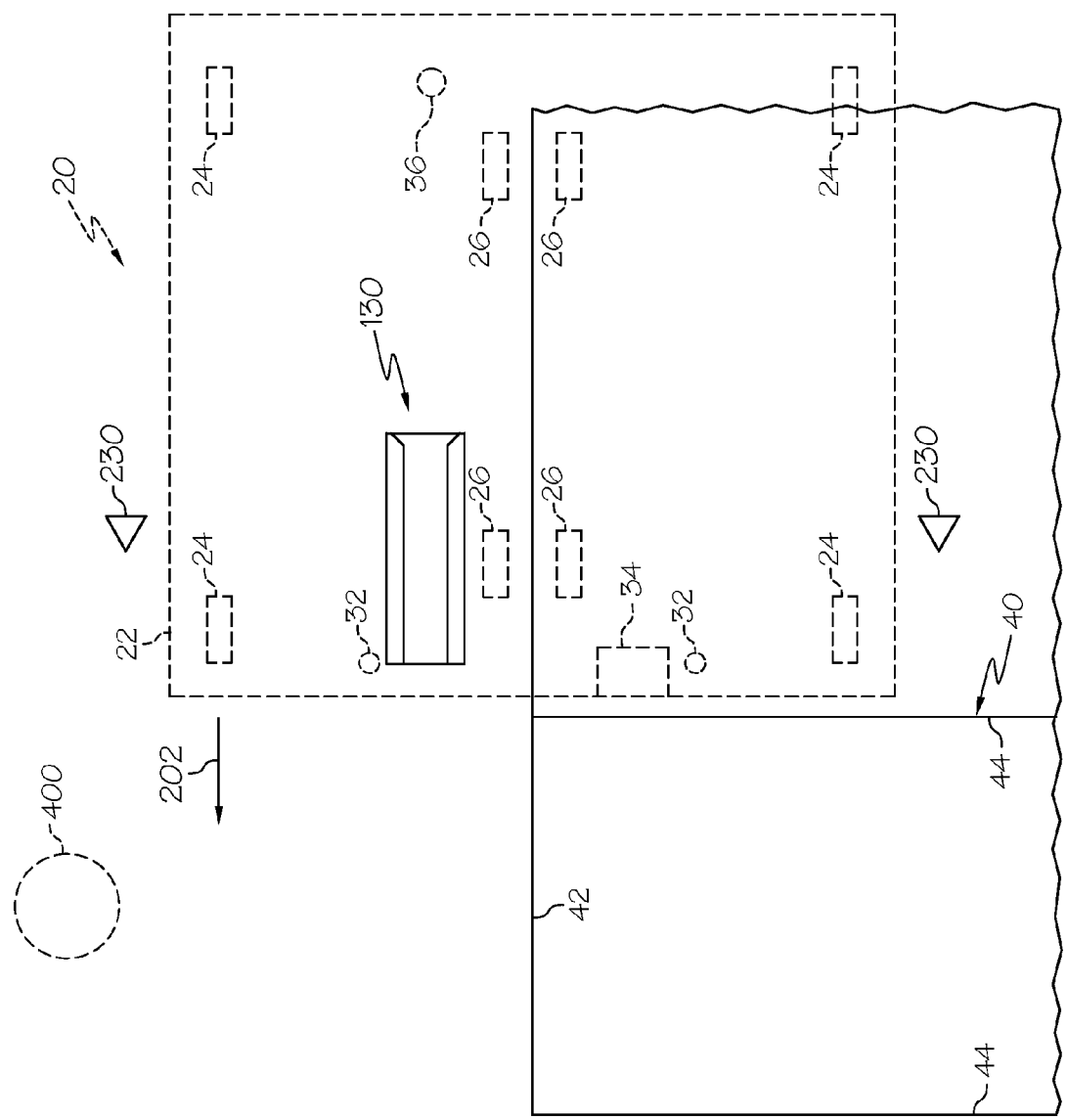
FIG. 4A depicts a schematic representation of an AGV system including the docking station and the autonomously guided vehicle of FIG. 1 moving along a navigation pathway according to one or more embodiments shown and described herein.
Figure 4A:
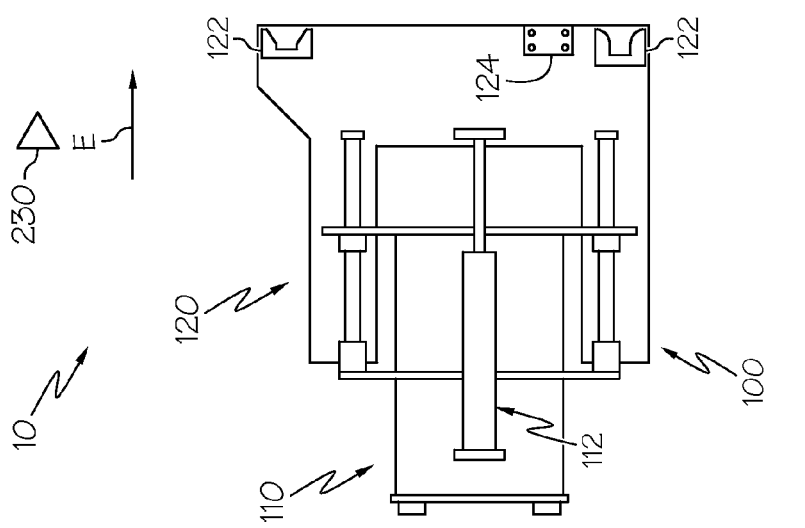

In the embodiment of the AGV system 10 depicted in FIG. 4A, a navigation pathway 40 defines a pre-determined path of travel of the AGV 20 along the factory floor. The navigation pathway 40 may include a wire that carries a radio frequency signal, a magnetic guide tape, or a colored guide tape. The navigation pathway 40 may further include beacons (e.g., RFID tags) that carry directional information that is receivable by the AGV 20. The AGV 20 includes guide sensors that determine the location of the navigation pathway 40. The drive mechanisms 26 of the AGV 20 are positioned to apply a drive force to the AGV 20 that tends to translate the AGV 20 along the navigation pathway 40. Any turns along the navigation pathway 40 are identified by the guide sensors, which instruct the drive mechanisms 26 to rotate to apply a force that tends to drive the AGV 20 along the navigation pathway 40.

As depicted in FIG. 4A, before the AGV 20 reaches the docking station 100, the shift unit 120 is positioned in an extended position by the actuator 112. The AGV 20 approaches the docking station 100 in a first direction of travel that is parallel to the shift unit movement direction 202, with the drive mechanisms 26 of the AGV 20 following a normal portion 42 of the navigation pathway 40.

Figure 4B:
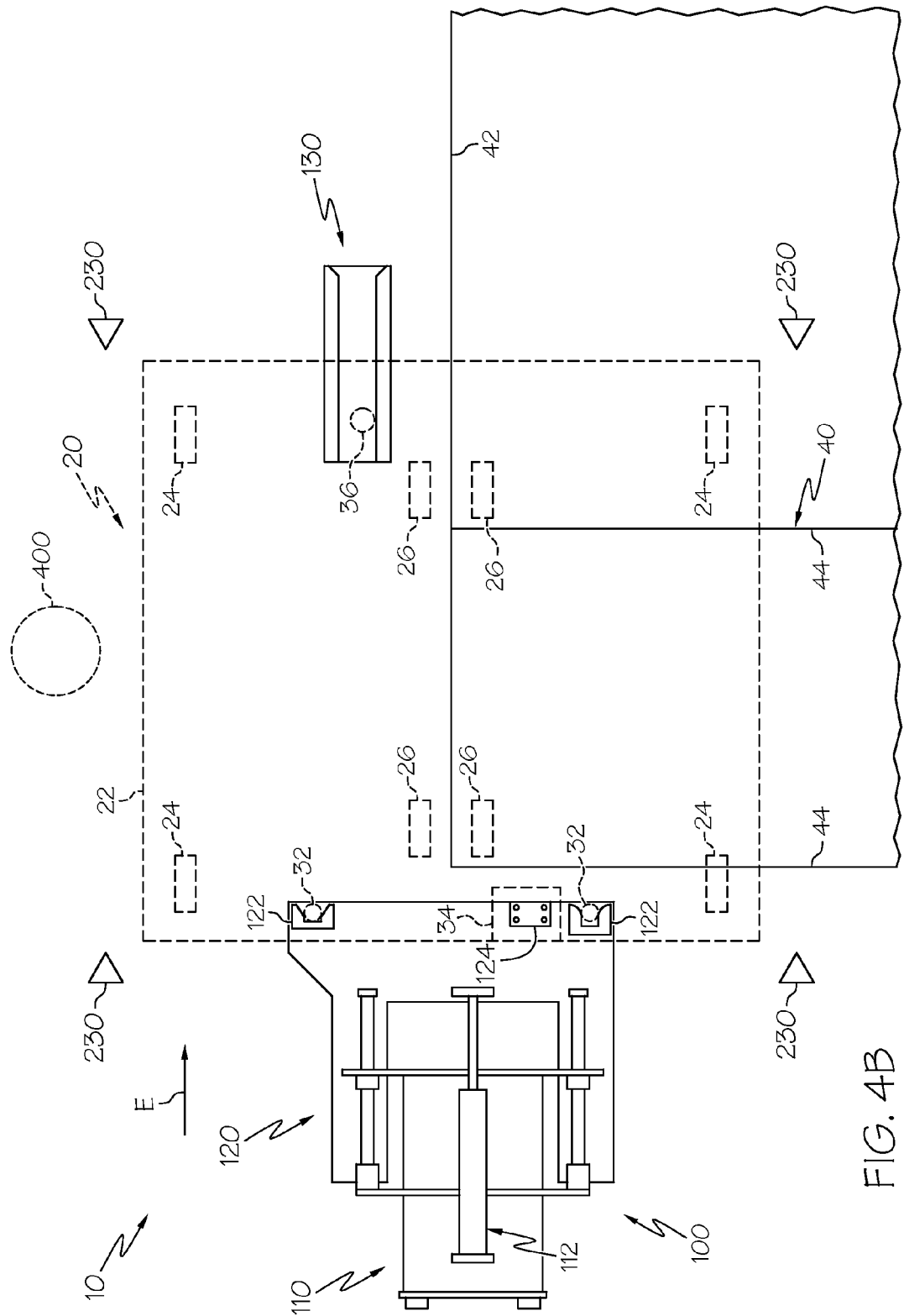
FIG. 4B depicts a schematic representation of the AGV system of FIG. 4A moving along the navigation pathway.

As depicted in FIG. 4B, the AGV 20 continues to travel along the normal portion 42 of the navigation pathway 40 in the shift unit movement direction 202 until the cam followers 32 come into contact with the locator blocks 122. As the cam followers 32 contact the locator blocks 122, the docking station 100 stops travel of the AGV 20. Additionally, the charging contact block 124 along the shift unit 120 of the docking station 100 may be aligned and placed in contact with the electrical connector 34 of the AGV 20. The drive mechanisms 26 of the AGV 20 may be given a command to stop applying a drive force to the AGV 20. The drive mechanisms 26 may also be given a command to brake. Application of brakes by the drive mechanisms 26 may assist with maintaining the position of the AGV 20 while stopped by the docking station 100. With the AGV 20 positioned relative to the docking station 100, the robot 400 can begin to loads parts onto the AGV 20.

Figure 4C:
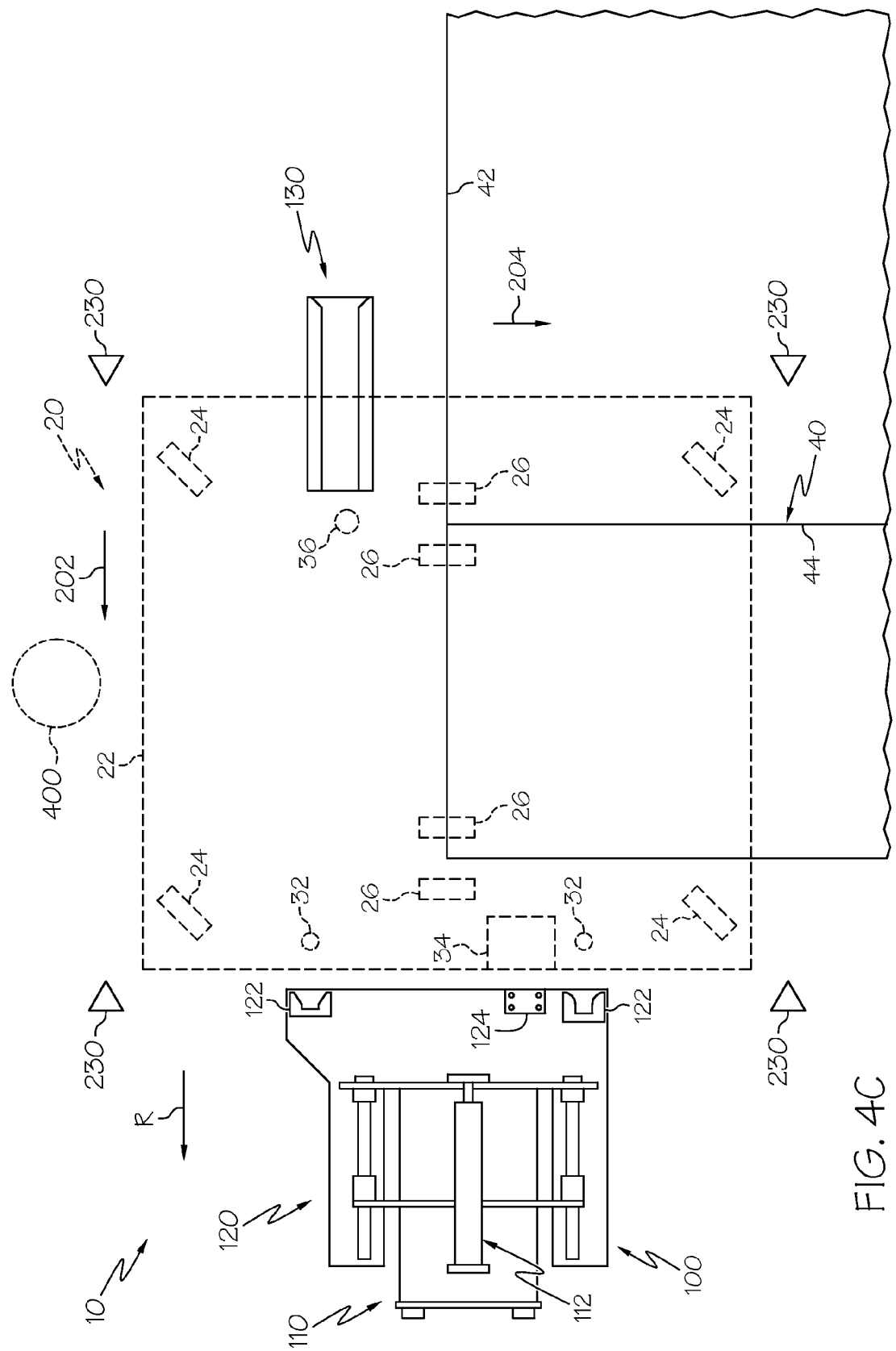
FIG. 4C depicts a schematic representation of the AGV system of FIG. 4A moving along the navigation pathway.

Referring now to FIG. 4C, after the robot 400 has loaded parts onto the AGV 20, the shift unit 120 is retracted by the actuator 112 towards the station base unit 110. With the shift unit 120 retracted, the AGV 20 has clearance to drive towards the docking station 100 without contact. As is illustrated, the AGV 20 moves towards the docking station 100 in the shift unit movement direction 202. As the drive mechanisms 26 approach the lateral portion 44 of the navigation pathway 40, the drive mechanisms 26 rotates to follow the navigation pathway 40. Once the drive mechanisms 26 are aligned along the lateral portion 44 of the navigation pathway 40, the drive mechanisms 26 apply force to the AGV 20 that tends to cause the AGV 20 to travel in a second direction of travel, i.e., in the lateral direction 204, or "crab." By applying a drive force to the AGV 20 in the lateral direction 204, the casters 24 begin to rotate towards parallel with the lateral portion 44 of the navigation pathway 40.

Figure 4D:
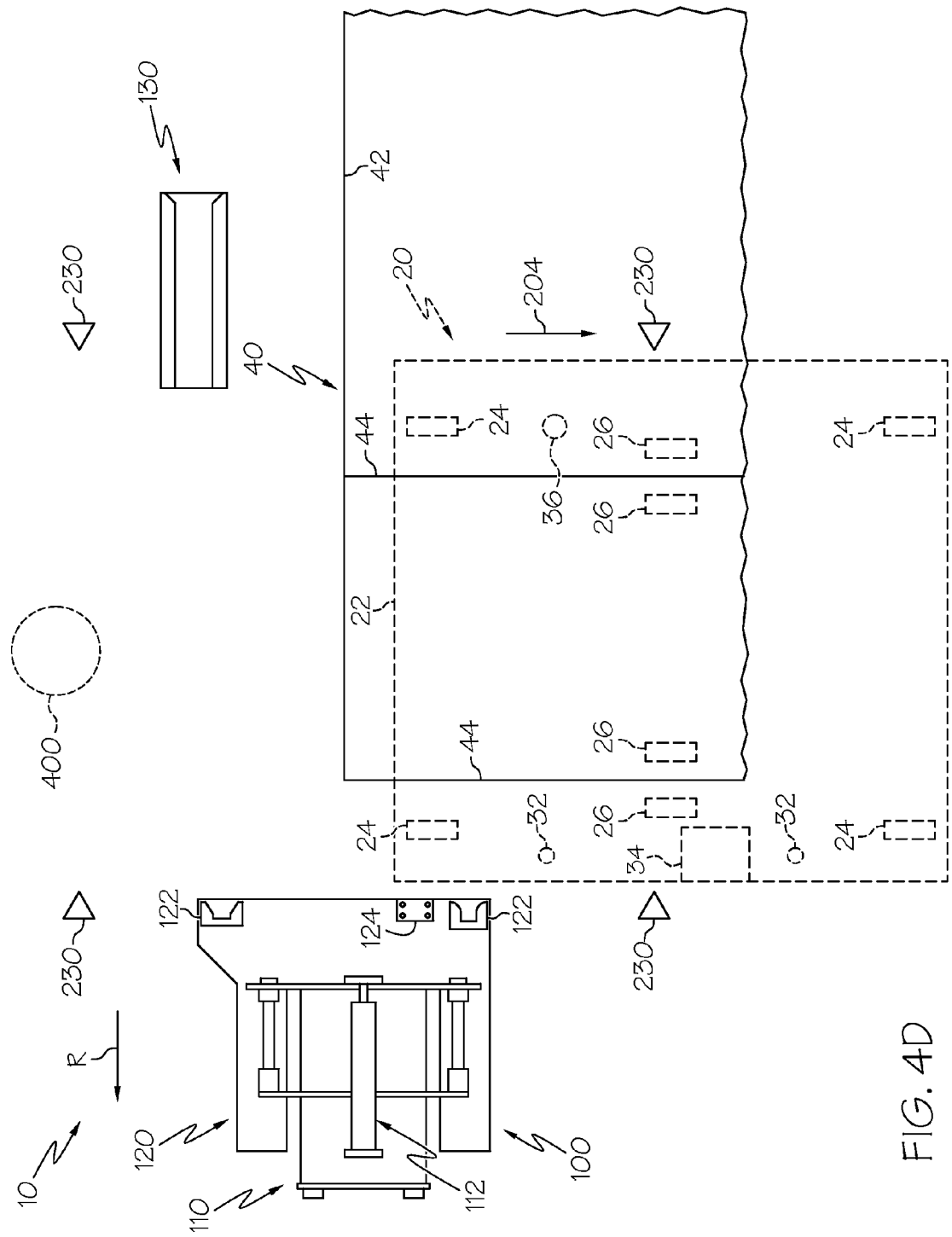
FIG. 4D depicts a schematic representation of the AGV system of FIG. 4A moving along the navigation pathway.

Referring now to FIG. 4D, as the AGV 20 continues to crab, following the lateral portion 44 of the navigation pathway 40, the casters 24 are aligned in the lateral direction 204 of travel of the AGV 20. Because the change in direction of travel of the AGV 20 from the shift unit movement direction 202 to the lateral direction 204 is less than or equal to about 90 degrees, the rotation of the casters 24 is predictable. Because the rotation of the casters 24 is predictable, the AGV 20 moves smoothly along the navigation pathway 40. Improvement in the predictability of the rotation of the casters 24 may reduce inadvertent interruption of reception of light beams of the light curtain 230 and may reduce off-course maneuvers of the AGV 20. Such improvements may reduce the need for intervention by a person to correct the AGV system 10 and may decrease downtime of the AGV system 10.

Figure 5:
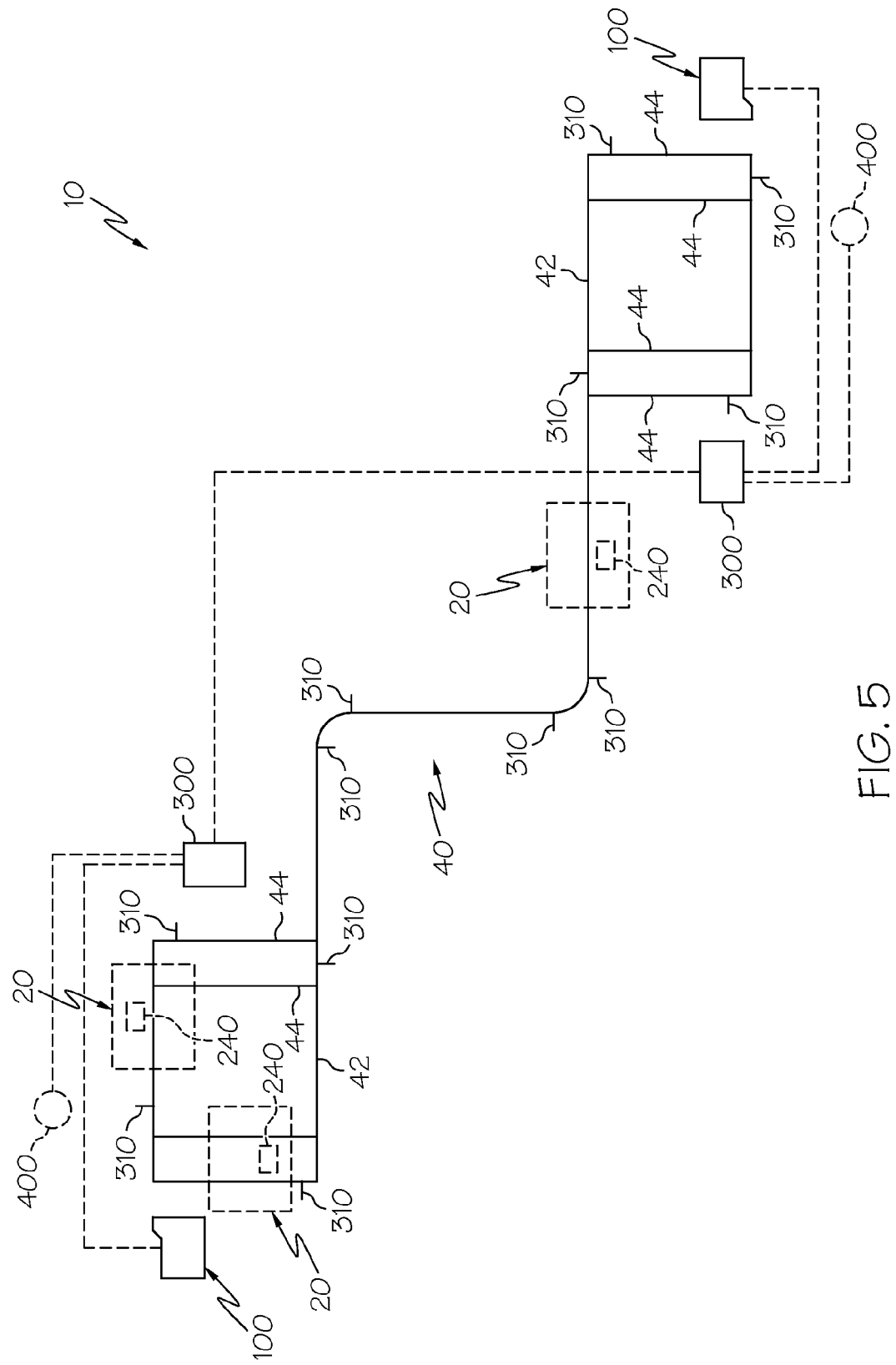
FIG. 5 depicts a schematic representation of an AGV system including a docking station and an autonomously guided vehicle according to one or more embodiments shown and described herein.

Referring now to FIG. 5, one embodiment of the AGV system 10 is configured to allow the AGV 20 to move autonomously through a factory environment. The AGV 20 may include a wireless communication device 240 that communicates with an electronic controller 300. The wireless communication device 240 may be communicatively coupled to a wireless communications network, for example, a wireless network that conforms to the FL-net standard. The wireless communication device 240 may also be able to receive wireless signals from various sources. Generally, the wireless communication device 240 may receive wireless signals from a plurality of location beacons 310 that indicate the location of the AGV 20 along the navigation pathway 40 within the factory environment, a location of one or more docking stations 100, and locations of obstacles. The speed and direction of the AGV 20 may be set based on the wireless signals that are received by the wireless communication device 240 from the location beacons 310 and/or the electronic controller 300. Infrared and/or ultrasonic sensors may also be used for collision avoidance of the AGV 20.

Additionally, the electronic controller 300 may communicate with the robot 400 and the docking station 100, to allow the AGV 20 to operate autonomously. For example, before the AGV 20 approaches a docking station 100, the docking station 100 may transmit a status signal to the electronic controller 300 that the docking station 100 is empty. The docking station 100 may further transmit a signal to the electronic controller 300 that the docking station 100 is in an extended position and ready to dock with an AGV 20. The electronic controller 300 may transmit a signal to the AGV 20 to drive towards the docking station 100. Once the AGV 20 is stopped by the docking station 100, the AGV 20 may receive a signal from the electronic controller 300 to apply brakes to the drive mechanisms 26 of the AGV 20. The electronic controller 300 may transmit a signal to the robot 400 that the AGV 20 is stopped at the docking station 100.

Once the robot 400 has loaded parts onto the AGV 20, the robot 400 may transmit a signal to the electronic controller 300 that the operation by the robot 400 is complete. The electronic controller 300 may then transmit a control signal to the docking station 100 to move the docking station 100 from the extended position to the retracted position. The electronic controller 300 may then transmit a signal to the AGV 20 to begin to drive along the navigation pathway 40. Thus, control of movement of the AGV 20 and positioning of the docking station 100 may be controlled by the electronic controller 300.

The electronic controller 300 may also control multiple AGVs 20 that drive along a single navigation pathway 40, as to manage traffic of the AGVs 20 along the navigation pathway 40. The electronic controller 300 may transmit a signal to one or more of the AGVs 20 to hold its position, allowing other AGVs 20 to continue along the navigation pathway 40 without interference.

It should now be understood that docking stations and AGVs according to the present disclosure allow AGVs to reliably position themselves relative to the docking station to facilitate accurate placement and/or removal of parts onto the AGVs by robots. Once parts filling is complete, a moving portion of the docking station moves to a retracted position to allow the AGV to continue to translate towards the docking station before the AGV turns to avoid contact with the docking station. By allowing the AGV to continue moving towards the docking station after the AGV was stopped, the casters of the AGV behave in a predictable manner, which reduces interruption of operation of the AGV.

Having described the disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

What is claimed is:

1. A docking station for an automated guided vehicle, the docking station comprising:
    a station base unit;
    a shift unit adapted to move relative to the station base unit between an extended position and a retracted position, wherein movement of the shift unit from the extended position to the retracted position defines a shift unit movement direction;
    an actuator coupled to the station base unit and the shift unit, the actuator adapted to move the shift unit between the extended position and the retracted position; and
    at least one locator block and/or at least one cam follower coupled to the shift unit;
    wherein the docking station stops an automated guided vehicle travelling in the shift unit movement direction when a portion of the automated guided vehicle contacts the at least one locator block and/or the at least one cam follower with the shift unit in the extended position.

2. The docking station of claim 1 further comprising a charging contact block coupled to the shift unit, wherein the charging contact block is adapted to interface with an electrical connector located along the automated guided vehicle for providing electrical current to the automated guided vehicle.

3. The docking station of claim 1 further comprising a floor guide located parallel to the shift unit movement direction.

4. The docking station of claim 1 further comprising linear bearings coupled to one of the station base unit or the shift unit and raceways coupled to one of the shift unit or the station base unit, wherein the linear bearings are positioned to slide along the raceways as to allow the shift unit to translate between the extended position and the retracted position.

5. The docking station of claim 1, wherein the actuator comprises a linear servomotor.

6. The docking station of claim 1 further comprising an extended position travel sensor that provides a signal that the shift unit is located in the extended position.

7. The docking station of claim 1 further comprising a retracted position travel sensor that provides a signal that the shift unit is located in the retracted position.

8. The docking station of claim 1, wherein the actuator provides a force to the shift unit that resists the automated guided vehicle from traveling in the shift unit movement direction.

9. The docking station of claim 1 further comprising an electronic controller adapted to transmit control signals to the actuator commanding the actuator to move the shift unit to the extended position or the retracted position.

10. The docking station of claim 9, wherein the electronic controller is further adapted to receive signals from an extended position travel sensor and a retracted position travel sensor to confirm a location of the shift unit in the extended position or the retracted position, respectively.

11. An automated guided vehicle system comprising:
an automated guided vehicle comprising a vehicle frame, a drive mechanism, and a plurality of support casters; and
a docking station comprising a station base unit;
wherein:
one of the docking station or the automated guided vehicle comprises a shift unit adapted to move relative to the station base unit of the docking station or the vehicle frame of the automated guided vehicle between an extended position and a retracted position, wherein movement of the shift unit from the extended position to the retracted position defines a shift unit movement direction;
the automated guided vehicle travelling parallel to the shift unit movement direction is stopped by the docking station when a portion of the automated guided vehicle contacts a portion of the docking station when the shift unit is located in the extended position;
one of the docking station or the automated guided vehicle comprises at least one cam follower;
one of the docking station or the automated guided vehicle comprises at least one locator block; and
the automated guided vehicle travelling in the shift unit movement direction is stopped by the docking station when the at least one cam follower contacts the at least one locator block when the shift unit is located in the extended position.

12. The automated guided vehicle system of claim 11 further comprising an actuator coupled to the shift unit and one of the station base unit of the docking station or the vehicle frame of the automated guided vehicle, the actuator adapted to move the shift unit between the extended position and the retracted position.

13. The automated guided vehicle system of claim 11 further comprising a charging contact block coupled to one of the docking station or the automated guided vehicle and an electrical connector coupled to one of the automated guided vehicle or the docking station, wherein the charging contact block is adapted to interface with the electrical connector when the automated guided vehicle is stopped by the docking station.

14. The automated guided vehicle system of claim 11, wherein the automated guided vehicle further comprises a track roller and the docking station further comprises a floor guide, wherein the track roller interfaces with the floor guide when the automated guided vehicle docks with the docking station.

15. The automated guided vehicle system of claim 11 further comprising an electronic controller adapted to command travel of the automated guided vehicle and to control movement of the shift unit between the extended position and the retracted position.

16. The docking station of claim 15, wherein the electronic controller is further adapted to receive signals from an extended position travel sensor and a retracted position travel sensor to confirm a location of the shift unit in the extended position or the retracted position, respectively.

17. An automated guided vehicle system comprising:
an automated guided vehicle comprising a vehicle frame, a drive mechanism, a plurality of support casters, and at least one cam follower; and
a docking station comprising a station base unit, a shift unit adapted to move relative to the station base unit between an extended position and a retracted position, wherein movement of the shift unit from the extended position to the retracted position defines a shift unit movement direction, an actuator coupled to the station base unit and the shift unit, and at least one locator block coupled to the shift unit,
wherein the automated guided vehicle travelling in the shift unit movement direction is stopped by the docking station when the at least one cam follower of the automated guided vehicle contacts the at least one locator block when the shift unit is located in the extended position.

18. The automated guided vehicle system of claim 17, wherein the automated guided vehicle further comprises a track roller and the docking station further comprises a floor guide, wherein the track roller interfaces with the floor guide when the automated guided vehicle docks with the docking station.

19. The automated guided vehicle system of claim 17 further comprising an electronic controller adapted to command travel of the automated guided vehicle and to control movement of the shift unit relative to the station base unit.

* * * * *